F. W. R. WILLIAMS.
TAPPING DEVICE FOR SIEVES OR SCREENS.
APPLICATION FILED AUG. 10, 1911.
1,022,911.
Patented Apr. 9, 1912.
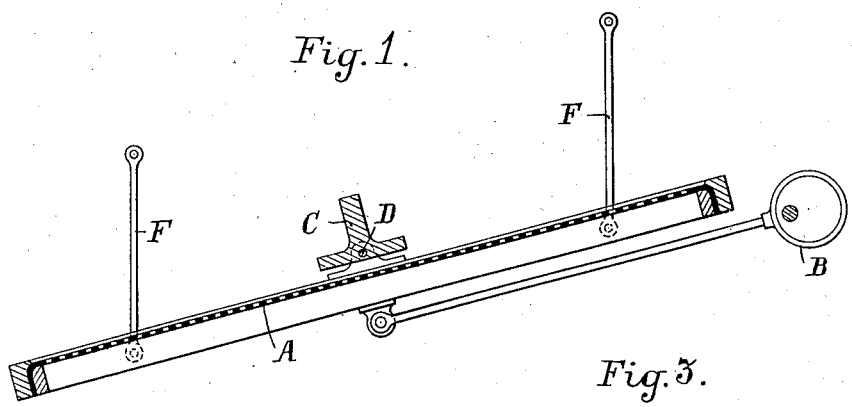
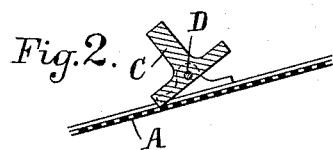
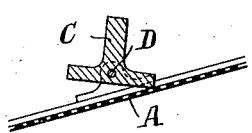
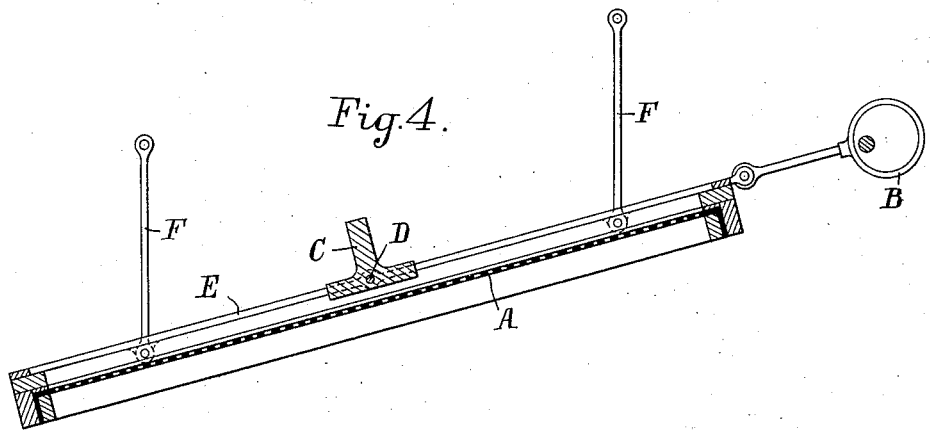
Witnesses:
Inventor
Frederick W. R. Williams
by
Atty.

UNITED STATES PATENT OFFICE.

FREDERICK WILLIAM ROGER WILLIAMS, OF LONDON, ENGLAND, ASSIGNOR OF ONE-HALF TO CHARLES HUDSON MOWER, OF LONDON, ENGLAND.

TAPPING DEVICE FOR SIEVES OR SCREENS.

1,022,911. Specification of Letters Patent. Patented Apr. 9, 1912.

Application filed August 10, 1911. Serial No. 643,411.

*To all whom it may concern:*

Be it known that I, FREDERICK WILLIAM ROGER WILLIAMS, a subject of the King of Great Britain, residing at London, England, have invented new and useful Improvements in Tapping Devices for Sieves or Screens, of which the following is a specification.

This invention relates to sieves or screens and has for its object the provision of an improved form of tapping device for tapping the screen while at work in order to facilitate the passage of the materials through the screen and thereby to increase the output of the screen.

The said improved tapping device comprises a rocking or tilting lever or bar arranged across the screen above the latter and so pivoted that it can tilt first one way and then the other in order to cause the sides of the lever or bar to tap the screen, the said lever or bar thus falling freely on to the screen by the effect of gravity and delivering with certainty an effective and heavy blow. When used in conjunction with a vibrating screen, the tapping device is pivoted to the screen frame, and the inertia of the said tapping device, during the to and fro movements of the screen produces the tilting motion of the bar or lever. When used in connection with a stationary screen the tapping device is pivoted to a vibrating frame arranged above the screen, such frame being vibrated, for example, by an eccentric. The movements of the frame automatically produce the rocking action of the tapping lever or bar and the screen is thereby tapped at each oscillation. Two or more tapping levers may be arranged in connection with the same screen.

In the accompanying drawings: Figure 1 is a longitudinal section of a vibratory screen with a tapping device carried thereby. Figs. 2 and 3 show portions of the screen with the tapping device in different positions. Fig. 4 illustrates in longitudinal section a stationary screen above which is a vibratory frame carrying the tapping device.

The screen A Fig. 1 is shown suspended by rods F and is vibrated in the usual manner by a crank or eccentric B. The tapping lever or bar C is arranged across the screen above the latter and is pivoted at D so that it can tilt either way as indicated in Figs. 2 and 3. The to and fro movements of the screen cause the tapping lever by its inertia to rock first one way and then the other and in this way the screen receives a tap at each vibration thereof, and the material which is being screened is thus prevented from accumulating on the wires of the screen.

In the arrangement shown in Fig. 4 the tapping lever is pivoted on a vibrating frame E suspended by rods F above a stationary screen A. The frame may be actuated by a crank or eccentric B, and its movements cause the tapping lever to rock to and fro and strike the stationary screen at each vibration of said frame.

What I claim is:

1. A vibratory sieve or screen combined with a tapping device consisting of a bar arranged across the screen above the latter and pivoted thereto so that it can rock or tilt and so that it is free to strike the screen assisted by gravity, the rocking movements being produced by the inertia of the tapping device during the vibratory movements of the said sieve or screen.

2. A stationary sieve or screen combined with a vibratory frame mounted above the said screen, and a tapping device pivoted on said vibratory frame so that it can rock or tilt, and strike the screen freely assisted by the effect of gravity at each movement, the rocking action of the tapping device being produced by the inertia of the said tapping device during the movements of the vibratory frame.

FREDERICK WILLIAM ROGER WILLIAMS.

Witnesses:
 WM. A. HARRIS,
 B. M. S. WINTER.

Copies of this patent may be obtained for five cents each, by addressing the "Commissioner of Patents, Washington, D. C."